United States Patent
Wu et al.

(10) Patent No.: US 7,149,214 B2
(45) Date of Patent: Dec. 12, 2006

(54) DYNAMIC UNKNOWN L2 FLOODING CONTROL WITH MAC LIMITS

(75) Inventors: Michael T. Wu, Palo Alto, CA (US); Anusankar Elangovan, San Jose, CA (US); Ramesh M. Santhanakrishnan, Sunnyvale, CA (US); Chengelpet V. Ramesh, San Jose, CA (US); Wafo L. Tengueu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 10/700,393

(22) Filed: Nov. 4, 2003

(65) Prior Publication Data

US 2005/0094634 A1    May 5, 2005

(51) Int. Cl.
*H04L 12/28* (2006.01)
*H04L 12/56* (2006.01)
*H04L 12/54* (2006.01)

(52) U.S. Cl. .................. 370/389; 370/392; 370/401
(58) Field of Classification Search ........ 370/387–401, 370/228–231, 412, 256, 432, 477, 414, 428, 370/386, 222, 352, 448, 334, 474, 328, 338, 370/469; 709/238, 243, 242, 253, 234, 213; 707/104, 104.1; 455/575, 458, 522, 69
See application file for complete search history.

(56) References Cited

U.S. PATENT DOCUMENTS

| | | | |
|---|---|---|---|
| 5,742,604 A |   | 4/1998 | Edsall et al. |
| 5,909,686 A | * | 6/1999 | Muller et al. ......... 707/104.41 |
| 5,938,736 A | * | 8/1999 | Muller et al. ............... 709/243 |
| 6,094,435 A | * | 7/2000 | Hoffman et al. ............ 370/414 |
| 6,118,760 A | * | 9/2000 | Zaumen et al. ............. 370/229 |
| 6,188,691 B1 | * | 2/2001 | Barkai et al. ............... 370/390 |
| 6,208,649 B1 | * | 3/2001 | Kloth ......................... 370/392 |
| 6,236,654 B1 | * | 5/2001 | Egbert ........................ 370/392 |
| 6,314,106 B1 | * | 11/2001 | King et al. ................. 370/412 |
| 6,393,473 B1 |   | 5/2002 | Chu |
| 6,469,983 B1 | * | 10/2002 | Narayana et al. ........... 370/231 |
| 6,556,541 B1 | * | 4/2003 | Bare ........................... 370/235 |
| 6,560,236 B1 | * | 5/2003 | Varghese et al. ............ 370/401 |
| 6,577,628 B1 | * | 6/2003 | Hejza ........................ 370/392 |

(Continued)

FOREIGN PATENT DOCUMENTS

GB    2 358 760 A    8/2001

OTHER PUBLICATIONS

"Notification of Transmittal of the International Search Report and the Written Opinion of the International Searching Authority, or the Declaration", International Application No. PCT/US04/34387 with an International Filing date of Oct. 18, 2004.

*Primary Examiner*—Chi Pham
*Assistant Examiner*—Prenell Jones
(74) *Attorney, Agent, or Firm*—Cesari and McKenna LLP

(57) ABSTRACT

A technique that may be used to limit the amount of flooding that occurs for a particular virtual local area network (VLAN) in a data network. Limits are established for VLANs processed by an intermediate node. Each limit indicates a number of forwarding database entries that may be associated with a particular VLAN. If the number of entries in the forwarding database reaches the limit established for a particular VLAN, an action is taken which may include limiting the amount of flooding that occurs for that VLAN.

50 Claims, 11 Drawing Sheets

U.S. PATENT DOCUMENTS

| | | | |
|---|---|---|---|
| 6,628,624 B1 * | 9/2003 | Mahajan et al. | 370/256 |
| 6,633,567 B1 * | 10/2003 | Brown | 370/395.3 |
| 6,735,670 B1 * | 5/2004 | Bronstein et al. | 711/108 |
| 6,757,279 B1 * | 6/2004 | Furlong et al. | 370/387 |
| 6,763,023 B1 * | 7/2004 | Gleeson et al. | 370/392 |
| 6,839,348 B1 | 1/2005 | Tang et al. | |
| 2002/0027906 A1 * | 3/2002 | Athreya et al. | 370/386 |
| 2002/0051450 A1 * | 5/2002 | Ganesh et al. | 370/389 |
| 2002/0124107 A1 * | 9/2002 | Goodwin | 709/242 |
| 2003/0067928 A1 * | 4/2003 | Gonda | 370/401 |
| 2003/0147405 A1 * | 8/2003 | Khill | 370/401 |
| 2003/0165140 A1 * | 9/2003 | Tang et al. | 370/393 |
| 2004/0184470 A1 * | 9/2004 | Holden | 370/412 |
| 2004/0215976 A1 * | 10/2004 | Jain | 713/201 |

* cited by examiner

DYNAMIC UNKNOWN L2 FLOODING CONTROL WITH MAC LIMITS

BACKGROUND OF THE INVENTION

1. Field of the Invention

The present invention relates to data networking and in particular to controlling packet flooding on VLANs contained in a data network.

2. Background Information

A data network is a geographically distributed collection of interconnected communication links and segments for transporting data between nodes, such as computers. The nodes typically transport the data over the network by exchanging discrete frames or packets containing the data in accordance with various pre-defined protocols, such as e.g., the Transmission Control Protocol/Internet Protocol (TCP/IP) or the Institute of Electrical and Electronics Engineers (IEEE) 802.3 protocol. In this context, a protocol consists of a set of rules defining how the nodes interact with each other to transfer data between them.

Many types of networks are available, with types ranging from local area net-works (LANs) to wide area networks (WANs). LANs typically connect nodes, such as personal computers and workstations, over dedicated private communication links located in the same general physical location, such as a building or a campus, to form a private network. WANs, on the other hand, typically connect large numbers of geographically dispersed nodes over long-distance communications links, such as common carrier telephone lines. The Internet is an example of a WAN that connects disparate net-works throughout the world, providing global communication between nodes contained in various networks. WANs often comprise a complex network of intermediate network nodes, such as routers or switches, that are interconnected to form the WAN and are often configured to perform various functions associated with transferring traffic through the WAN.

Some organizations implement virtual LANs (VLANs) in their private networks to "logically" group entities, such as users, servers, and other resources within the organization. A VLAN is a logical group of entities, such as end nodes and servers, which appear to one another as if they are on the same physical LAN segment even though they may be spread across a large network comprising many different physical segments. A VLAN operates at the data link layer, which is layer-2 (L2) of the Open Systems Interconnect (OSI) reference model.

An organization may utilize one or more intermediate nodes, such as L2 switches, to couple various entities in the network that belong to a particular VLAN. These intermediate nodes may employ special hardware or software that is configured to "learn" various information about the entities belonging to the VLAN and place this information in a forwarding database that is used by the intermediate node to forward packets acquired by the node to the various entities. The learned information may include a VLAN and a media access control (MAC) address associated with the entity, as well as a port identifier (ID) of a port on the intermediate node through which the entity may be reached.

Often intermediate nodes employ a content-addressable memory (CAM) to store the forwarding database information. CAMs are usually implemented in hardware as an application specific memory device that allows its entire contents to be searched within a single clock cycle. Two common types of CAMs include binary CAMs and ternary CAMs (TCAMs). A binary CAM performs exact-match searches, whereas a TCAM allows pattern matching with the use of "don't cares" which act as wildcards during a search. Because TCAMs are somewhat more versatile than binary CAMs, intermediate nodes often employ one or more TCAM devices to implement the intermediate node's forwarding database.

TCAM devices are often limited with regards to their storage capacity. For example, a typical TCAM device may contain upwards to 32,768 (32K) entries. In a typical forwarding database arrangement, the TCAMs are configured such that each entry holds forwarding database information associated with a particular entity accessible to the intermediate node. Thus, forwarding databases implemented using TCAM devices are often limited to containing information for only up to 32K entities.

The entries in a forwarding database are typically populated using a technique known as "learning." Learning involves identifying information about an entity in the network, such as a MAC address, VLAN, and destination port associated with the entity, and placing this information in a forwarding database entry. For example, assume an intermediate node acquires a packet on a source port "C" containing a source MAC address "A." Further assume the port is associated with a VLAN "B." The intermediate node applies the MAC address "A" to its forwarding database to determine if an entry associated with entity "A" already exists in the database. Assuming an entry does not exist, the intermediate node "learns" about the entity by placing the entity's address, VLAN and source port information associated with the entity in an entry in its forwarding database. Thus, in the above example, the intermediate node creates an entry in the forwarding database associated with the entity that contains "A," "B" and "C" to represent the address, VLAN and source port associated with the entity, respectively. The intermediate node may later use this information to forward packets that are destined for the entity.

In addition to learning, an intermediate node may further process a packet by performing a "lookup" operation to identify a destination port associated with the packet and forwarding the packet to the destination port. The lookup operation may involve applying a destination address contained in the packet to the forwarding database to determine if the database contains an entry with an address that matches the destination address. If a matching entry is found, the intermediate node forwards the packet to the destination node via a destination port specified in the matching entry. If a matching entry is not found, the intermediate node may alternatively "flood" the packet out all ports in an attempt to reach the destination node. Flooding usually involves sending a copy of the packet onto each of the intermediate node's ports, except the source port on which the packet was acquired.

One problem with the learning technique described above is that it is possible for entities belonging to a VLAN to occupy all or an inordinate amount of the entries in a forwarding database, thus potentially causing the intermediate node to constantly learn about entities belonging to other VLANs. For example, if the number of entities belonging to a particular VLAN is greater than the number of entries in a forwarding table, it is possible for the forwarding table to contain only entries associated with that VLAN. Entries associated with entities from other VLANs end up being displaced and, consequently, have to be re-learned. This could lead to a continuous cycle of displacement and re-learning that, in turn, may significantly impact the packet processing performance of the intermediate node.

Another problem that may occur when a VLAN's entities occupy all or an inordinate amount of entries in a forwarding table is excessive flooding, particularly when processing packets destined for entities belonging to other VLANs. Such excessive flooding may cause the network's performance to be degraded significantly. For example, assume, as above, a first VLAN has more entities than entries in a forwarding database and that the entities are active and that the entire database is occupied with entries associated with the entities. Packets acquired from a second VLAN would have to be flooded because the forwarding database would not contain an entry associated with the destination addresses of the acquired packets. If the first VLAN continually occupies all the entries in the forwarding database before packets from the second VLAN are acquired and processed, the packets for the second VLAN would have to be continually flooded which, in turn, may lead to excessive traffic being generated and introduced into the network when processing packets for the second VLAN. This excessive traffic may further lead to network congestion and consequently network degradation.

SUMMARY OF THE INVENTION

The present invention overcomes the disadvantages of the prior art by providing a technique that may be used by an intermediate node to control flooding of packets on a virtual local area network (VLAN) contained in a data network. According to the technique, a limit is established for each VLAN wherein the limit indicates a number of forwarding database entries that may be associated with the VLAN. A count is generated which indicates the number of entries in the forwarding database associated with the VLAN. The count is compared with the limit to determine if the count matches the limit. If so, an action is taken to control the flooding of packets on that VLAN.

In the illustrative embodiment, an intermediate node contains one or more Encoded Address Recognition Logic (EARL) devices each of which is configured to learn and forward packets acquired by the intermediate node from a data network. In addition, each EARL device contains a forwarding database and a media access control (MAC) limit database. The forwarding database is configured to hold VLAN, MAC address, and port relationships for packets processed by the intermediate node. The MAC limit database is configured to hold various information about VLANs contained in the network, including a MAC limit and a MAC count for each VLAN. The MAC limit is a pre-defined value that indicates a "ceiling" as to the number of entries in the forwarding database that may be associated with a particular VLAN. The MAC count is a value that indicates the actual number of entries in the forwarding database that are associated with the VLAN.

Each EARL executes a MAC limit process, i.e., a software process that monitors the forwarding database and determines the MAC count value for the VLANs. Moreover, the MAC limit process determines if the MAC count for a VLAN matches the MAC limit for the VLAN and if so, takes a predefined action. This action may include issuing a warning to a system log, limiting learning entries for the VLAN, limiting flooding packets for the VLAN, or shutting down the VLAN.

Advantageously, the present invention provides a technique that limits the number of entries in the forwarding database that may be associated with a VLAN, thus, obviating the use of all or a significant portion of the forwarding database entries by a single or a small group of VLANs. By limiting the number of entries in this manner, the inventive technique limits the amount of flooding traffic that may be generated by processing packets for VLANs that are displaced by e.g., VLANs associated with entities that occupy all or a significant portion of the forwarding database.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
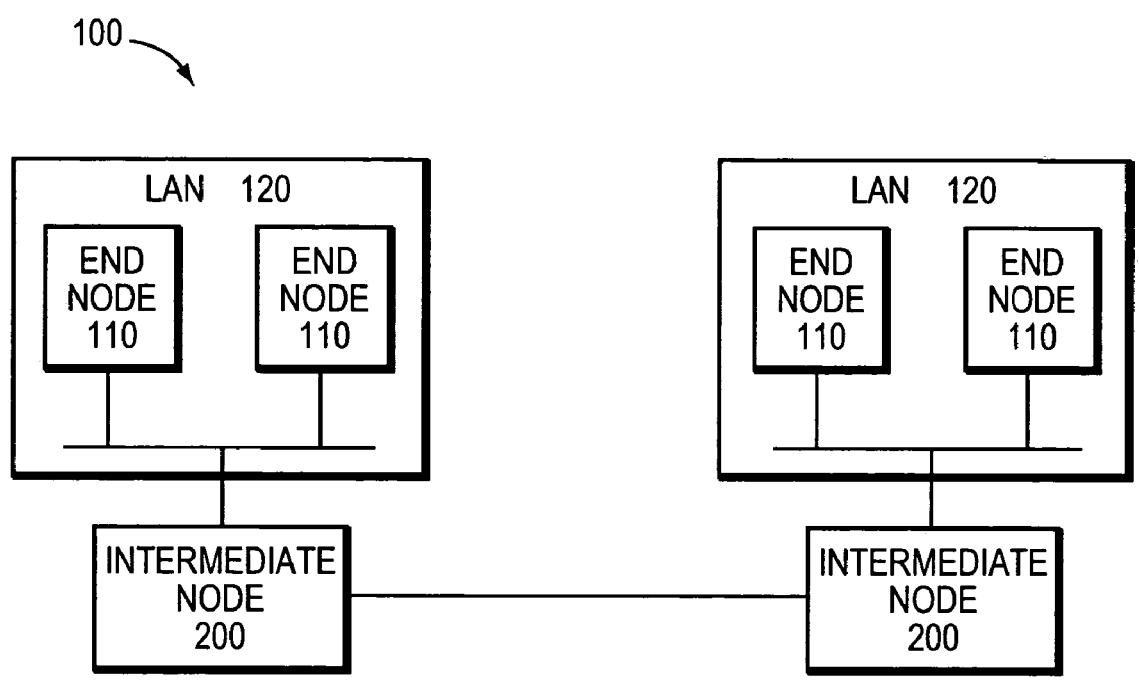
FIG. 1 is a schematic block diagram of an exemplary network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Institute of Electrical and Electronic Engineers (IEEE) 802.3 protocol.

Figure 2:
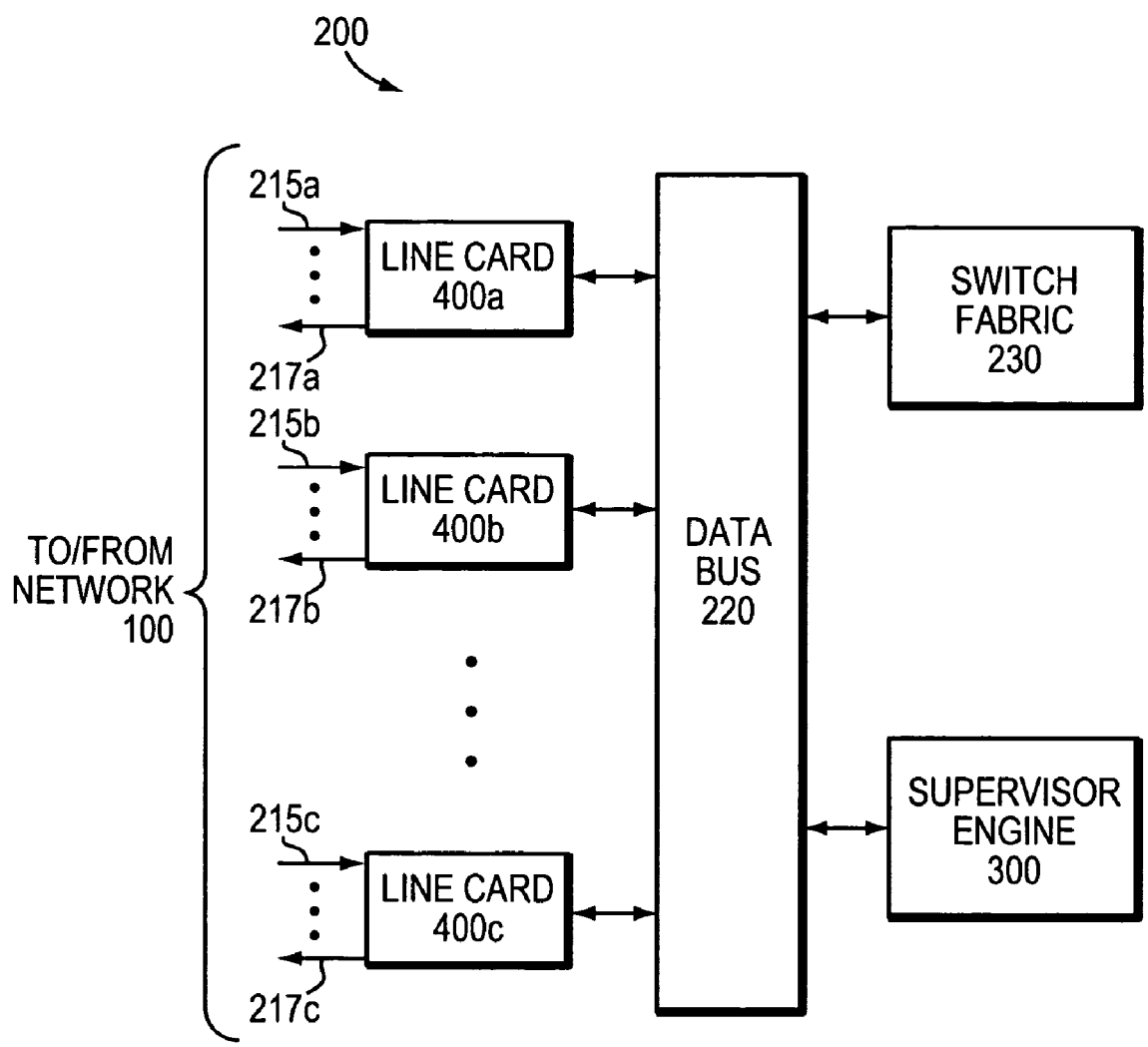
FIG. 2 is a high-level partial schematic block diagram of an intermediate node that may be advantageously used with the present invention.

FIG. 2 is a high-level partial schematic block diagram of intermediate node 200 that may be advantageously used with the present invention. Suitable intermediate nodes that may be used with the present invention include the Cisco 6500 Series Routers and Cisco 7600 Series Routers available from Cisco Systems Incorporated, San Jose, Calif. Intermediate node 200 comprises one or more line cards 400, a switch fabric card 230, and a supervisor engine card 300 interconnected by a data bus 220. Node 200 is configured to perform, inter alia, various conventional layer-2 (L2)

and layer-3 (L3) switching and routing functions including switching and routing data packets. Moreover, node 200 is configured to provide support for various combinations of communication protocols including, e.g., TCP/IP, Ethernet, Asynchronous Transfer Mode (ATM), and multi-channel T3.

The data bus 220 comprises a point-to-point interconnect bus that interconnects the various cards and allows data and signals to be transferred from one card to another. The switch fabric 230 is a conventional switch fabric device configured to operate in conjunction with the line cards 400 and supervisor engine 300 to improve system bandwidth. To that end, the switch fabric 230 contains logic that is configured to acquire packets from the supervisor engine 300 and the line cards 400, determine a destination (e.g., a line card 400) for the packet, and transfer the packet to the destination.

The line cards 400 connect (interface) the intermediate node 200 with the network 100. The line cards 400 transfer and acquire data packets to and from the network via output ports 217 and input ports 215, respectively, using various protocols such as, e.g., ATM, Ethernet, T3. Functionally, the line cards 400 acquire data packets from the network 100 via the input ports 215 and forward the data packets to the data bus 220, as well as transmit data packets received from the data bus 220 to the network 100 via the output ports 217. The ports 215, 217 may comprise, e.g., ATM, Ethernet, Fast Ethernet (FE), Gigabit Ethernet (GE), and frame relay (FR) ports.

Figure 3:
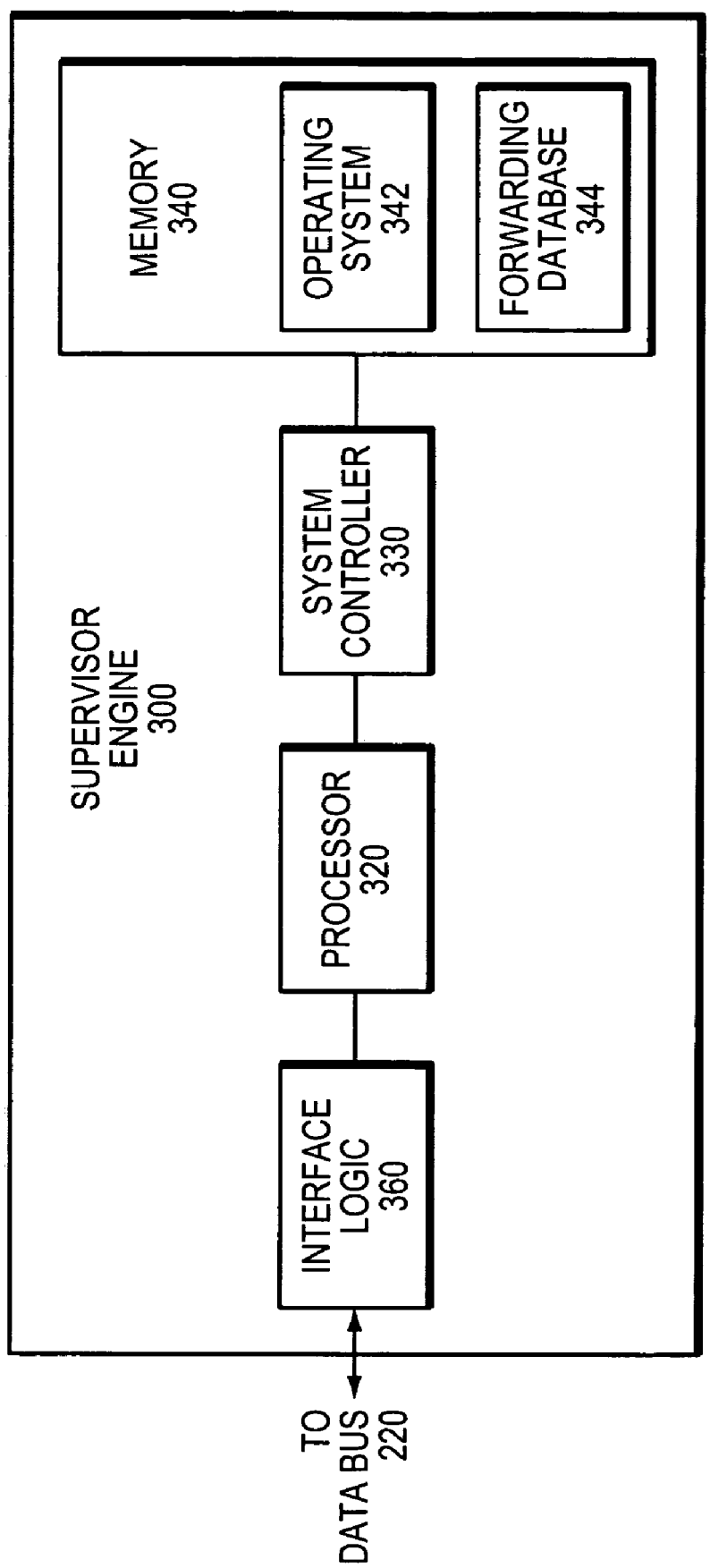
FIG. 3 is a high-level partial schematic block diagram of a supervisor engine that may be advantageously used with the present invention.

The supervisor engine 300 comprises logic that is, inter alia, configured to manage node 200 and maintain a centralized forwarding database that it distributes to the line cards 400. FIG. 3 is a high-level partial schematic block diagram of a supervisor engine that may be advantageously used with the present invention. Supervisor engine 300 comprises a processor 320, system controller 330, interface logic 360, and memory 340. The memory 340 comprises random access memory (RAM) locations addressable by the system controller 330 for storing, inter alia, data structures and software programs. An operating system 342, portions of which are typically resident in memory 340 and executed by the processor 320, functionally organizes the intermediate node 200 by, inter alia, invoking network operations in support of software processes executing on the supervisor engine 300. These processes may include software functions that implement various routing and switching protocols supported by the intermediate node 200, as well as processes that implement various functions performed by the supervisor engine, such as management of the intermediate node. Interface logic 360 is coupled to the data bus 220, and is configured to transfer data between the data bus 220 and the processor 320.

Memory 340 is illustratively a 128 Megabyte (Mb) memory implemented using Dynamic Random Access Memory (DRAM) devices that contains various software and data structures used by processor 320. These data structures include a forwarding database 344 that contains various forwarding information, such as media access control (MAC) addresses of nodes in the network, as well as virtual local area network (VLAN) identifiers (IDs) and destination port IDs associated with the nodes. System controller 330 is coupled to the processor 320 and memory 340, and comprises circuitry configured to enable processor 320 to access (e.g., read, write) memory locations contained in memory 340.

Processor 320 is a conventional routing processor configured, inter alia, to execute instructions contained in memory 340 for maintaining and distributing forwarding database 344. Specifically, processor 320 executes instructions that acquire information about packets processed by the various line cards 400, such as VLAN IDs, ports, and MAC addresses associated with the packets and uses this information to maintain forwarding database 344. Moreover, processor 320 executes instructions to distribute its forwarding database 344 to the various line cards 400 that, as will be discussed further below, may process this information to update and maintain their versions of forwarding databases.

Figure 4:
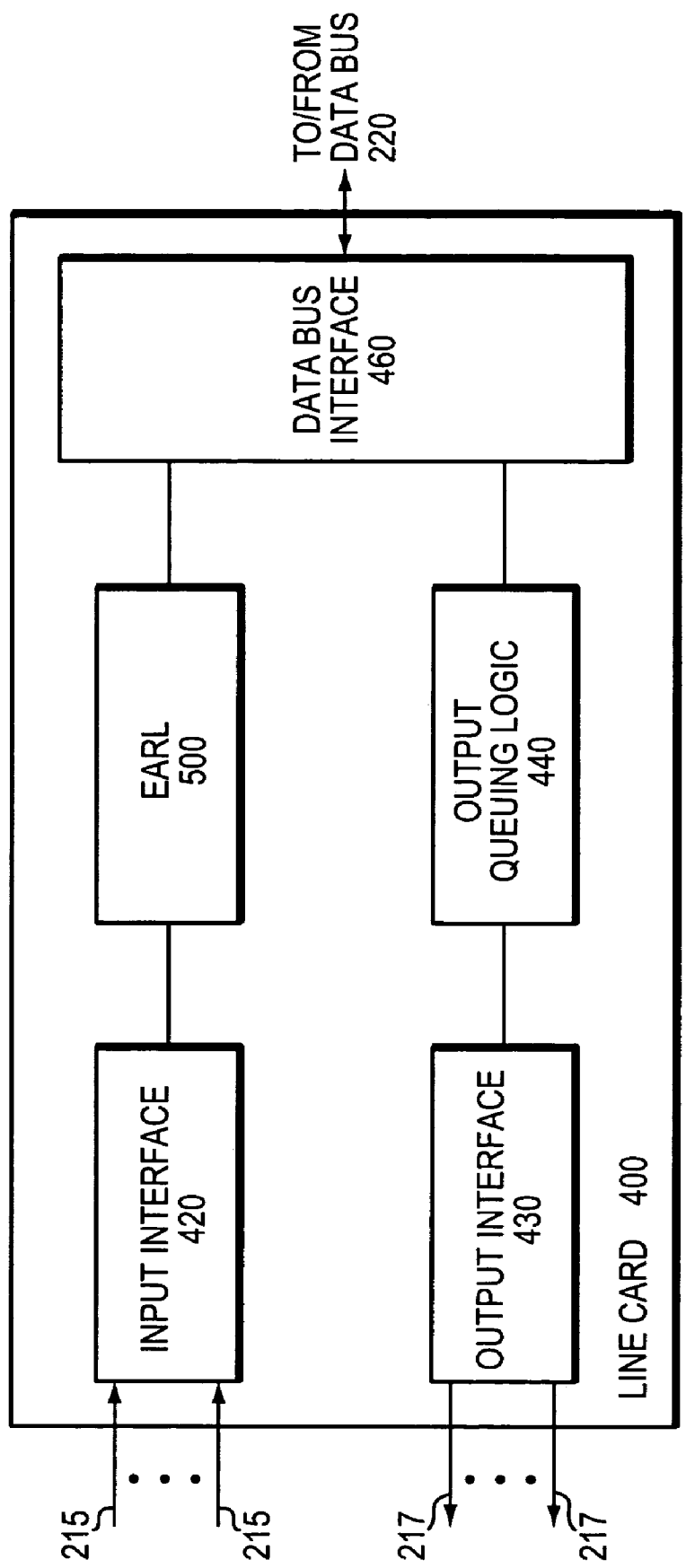
FIG. 4 is a high-level partial schematic block diagram of a line card that may be advantageously used with the present invention.

FIG. 4 is a high-level partial schematic block diagram of a line card 400 that may be advantageously used with the present invention. Line card 400 comprises input interface logic 420, encoded address recognition logic (EARL) 500, data bus interface logic 460, output interface logic 430 and output queuing logic 440. Each line card may contain a plurality of input 215 and output 217 ports coupled to the network 100. The input interface logic 420 and output interface logic 430 interface the line card to the network 100 via the input 215 and output 217 ports, respectively, and enable the line card to transfer and acquire data to and from the network. To that end, logic 420 and 430 comprise conventional interface circuitry that may incorporate the signal, electrical and mechanical characteristics, and interchange circuits, needed to interface line card 400 with the network's physical media and protocols running over that media.

The data bus interface logic 460 contains interface circuitry that interfaces the line card to the data bus 220 and enables the line card 400 to transfer and acquire data to and from other cards coupled to the bus 220. The output queuing logic 440 contains circuitry, such as output queues and scheduling control logic, configured to control the transfer of data (e.g., data packets) onto the network 100 via the output interface 430.

Figure 5:
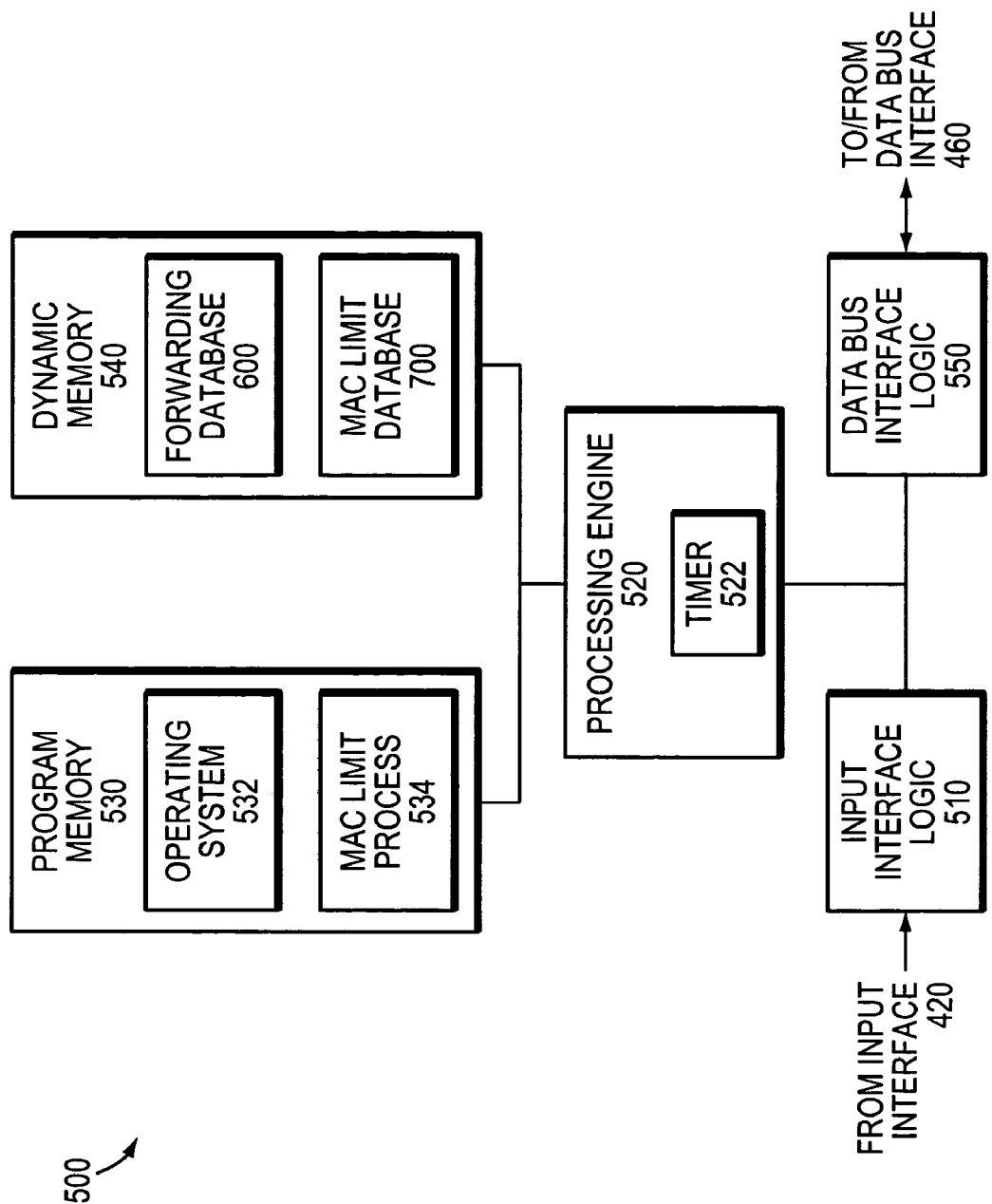
FIG. 5 is a high-level partial schematic block diagram of Encoded Address Recognition Logic (EARL) that may be advantageously used with the present invention.

The EARL 500 is illustratively embodied in an application-specific integrated circuit (ASIC) that comprises circuitry configured, inter alia, to acquire data packets and process them in accordance with the inventive technique. FIG. 5 is a high-level partial schematic block diagram of an EARL 500 that may be advantageously used with the present invention. EARL 500 comprises input interface logic 510, data bus interface logic 550, a program memory 530 and a dynamic memory 540 all coupled to a processing engine 520. The input interface logic 510 contains circuitry configured to acquire data packets from the input interface 420 and enable the processing engine 520 to access the packets. Likewise, the data bus interface logic 550 contains circuitry that enables the processing engine 520 to direct the transfer of acquired packets to the data bus interface 460. In addition, the input interface logic 510 and data bus interface logic 550 may contain buffers accessible to engine 520 that are configured to hold the acquired packets.

The processing engine 520 is a conventional processor containing various logic, such as arithmetic logic units (ALUs) and execution units (EUs), configured to execute computer executable instructions and manipulate data contained in the program memory 530 and dynamic memory 540. In addition, engine 520 contains logic configured to access packets acquired by the input interface logic 510 from the input interface 420 and direct the transfer of packets to the data bus interface 460 via the data bus interface logic 550. Moreover, engine 520 contains a conventional timer circuit 522 which, illustratively, is a programmable interval timer that may be configured by engine 520 to expire at predetermined intervals.

The program memory 530 and dynamic memory 540 are, illustratively, conventional computer readable mediums containing random-access memory locations configured to hold data and computer executable instructions accessible to the processing engine 520. Memory 530 contains a multi-tasking operating system 532 that functionally organizes processing engine 520 in a manner that enables engine 520 to perform various conventional operating system functions, such as providing system services, timer services, and scheduling various software processes for execution. Program memory 530 also contains a MAC limit process 534 that is a software process that operates under control of the operating system 532 and contains computer executable instructions executable by engine 520 that configure engine 520 to perform various functions including functions that incorporate aspects of the inventive technique.

Dynamic memory 540 is, likewise, a computer readable medium containing random-access memory locations accessible to the processing engine 520. Memory 540 contains various data structures, such as forwarding database 600 and MAC limit database 700, which are illustratively used by engine 520 to process packets in accordance with the inventive technique. It should be noted that memory 540 may be a content-addressable memory (CAM) implemented using CAM devices accessible to engine 520.

Figure 6:
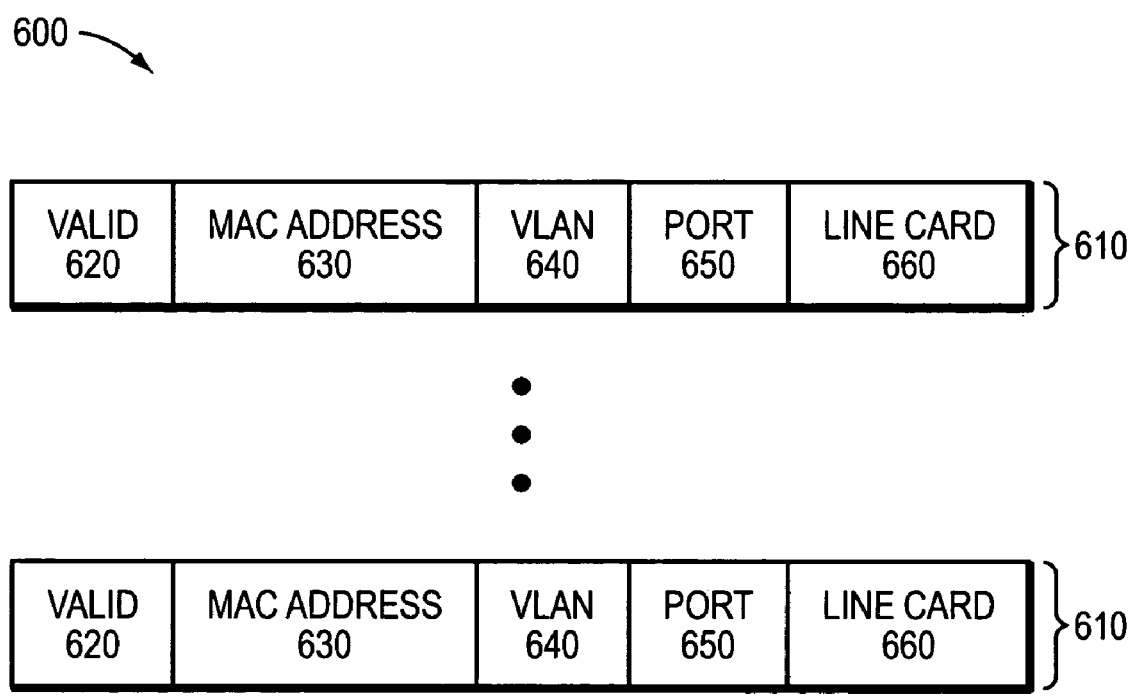
FIG. 6 is a schematic block diagram of a forwarding database that may be advantageously used with the present invention.

FIG. 6 is a schematic block diagram of forwarding database 600 illustrated as a table comprising one or more entries 610 wherein each entry 610 represents a node accessible to intermediate node 200 via the data network. Entry 610 contains a valid field 620, a MAC address field 630, a VLAN field 640, a port field 650 and a line card field 660. The valid field 620 is illustratively a one-bit field that holds an indicator indicating whether the remaining fields in the entry 610 contain valid information. Illustratively, this field holds a value of one if the entry 610 contains valid information.

The MAC address field 630 is illustratively a 48-bit field that holds the MAC address of the node represented by the entry 610. The VLAN field 640 holds an identifier that identifies a VLAN associated with the entry 610. Likewise, the port field 650 and line card field 660 hold identifiers that identify the port and line card 400 associated with the node represented by the entry 610. Illustratively, the identifiers contained in the line card field 660 and the port field 650 represent a line card 400 and an output port 217 on the line card 400 through which the node represented by the entry 610 may be reached, respectively. It should be noted that various entries 610 in database 600 may not be associated with a VLAN. For such entries, the VLAN field 640 contains a value that indicates the entry is not associated with a VLAN.

Functionally, the processor 320 distributes forwarding database information 344 contained in the supervisor engine 300 to each of the line cards 400 via data bus 220. At each line card, the information is acquired by the data bus interface logic 460 and transferred to the EARL 500 which processes the information including configuring its forwarding database 600 using the information. A packet acquired by a line card 400 at an input port 215 is transferred to the input interface 420 which, in turn, transfers the packet to the EARL 500. The EARL 500 applies a destination address contained in the packet to the forwarding database 600 to determine if an entry 610 in the database 600 contains a MAC address 630 that matches the destination address in the packet. If so, the EARL 500 examines the content of the line card field 660 and determines if the packet is switched to an output port 217 on the line card 400 or is destined for another card coupled to the data bus 220. If the packet is destined for another card (e.g., another line card 400), the EARL 500 transfers the packet along with the port information 650 via the data bus interface 460 onto the data bus 220 to the switch fabric 230. The switch fabric 230, in turn, transfers the packet and port information 650 to the card for further processing.

If the packet is not destined for another card, i.e., it is destined for an output port 217 contained on the line card 400 itself, the EARL 500 directs the data bus interface logic 460 to transfer the packet to the output queuing logic 440. The output queuing logic 440 places the packet onto an appropriate output queue for transfer onto the network via the output port 217.

The present invention incorporates a technique that may be used to limit the amount of flooding that occurs for a particular virtual local area network (VLAN) in a data network. According to the technique, a limit is established for each VLAN processed by an intermediate node contained in the network. The limit indicates a number of forwarding table entries that may be associated with the VLAN. The intermediate node determines the actual number of entries in the forwarding table associated the VLAN and compares this number with the limit to determine if the number matches the limit. If so, an action is taken which may include limiting the amount of flooding that occurs for that VLAN.

Figure 7:
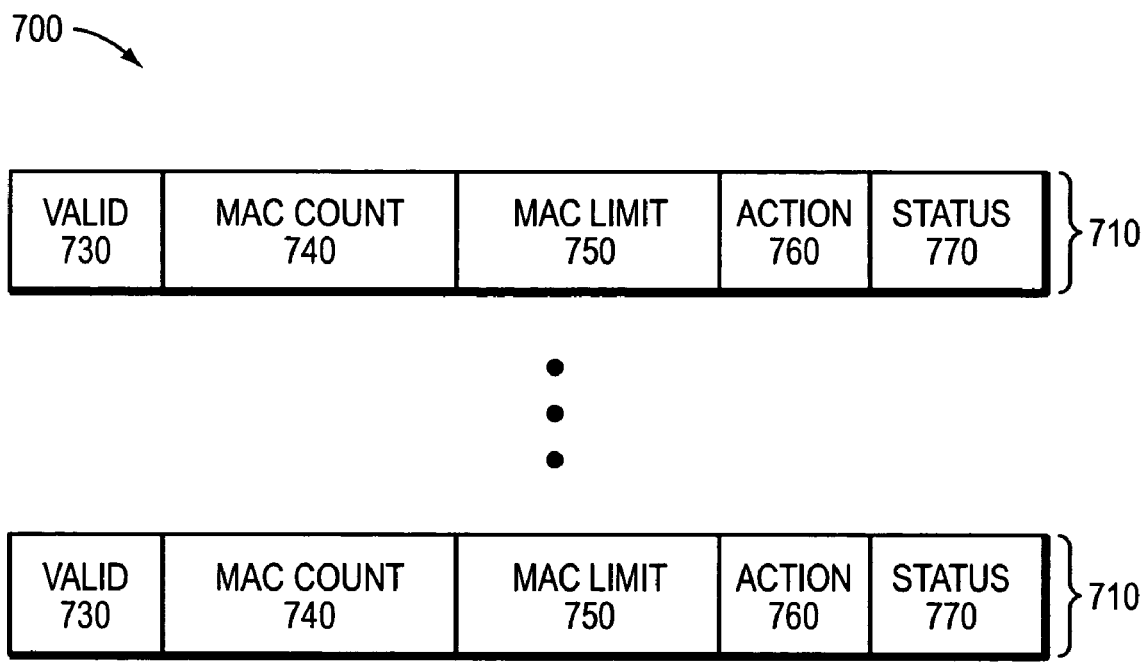
FIG. 7 is a schematic block diagram of a media access control (MAC) limit database that may be advantageously used with the present invention.

The MAC limit database data structure 700 is illustratively a table comprising one or more entries 710 wherein each entry holds information associated with a particular VLAN. FIG. 7 is a high-level schematic block diagram of a MAC limit database 700 that may be advantageously used with the present invention. MAC limit database 700 is illustratively a table comprising one or more entries 710 wherein each entry 710 is associated with a VLAN and contains a VLAN field 730, a MAC count field 740, a MAC limit field 750, an action field 760 and a status field 770. The VLAN field 730 holds an identifier that identifies the VLAN associated with the entry. The MAC count field holds a value that represents the number of forwarding database entries 610 in the forwarding database 600 that is associated with the VLAN. The MAC limit field 750 holds a value that represents, illustratively, a maximum number of entries 610 in the forwarding database 600 that may be associated with the VLAN. The action field 760 contains an identifier that identifies an action that is taken when the MAC count 740 matches the MAC limit 750. Illustratively, this action may include logging a warning, cease "learning" for the VLAN (e.g., stop associating new entries 610 with the VLAN), cease flooding packets for the VLAN and/or shutting down the VLAN (e.g., cease forwarding traffic for the VLAN).

The status field 770 holds a status associated with the VLAN that represents the state of the VLAN. Illustratively, this state includes a "shut down" state, a "no learning" state, a "no flooding" state and an "active" state. The "shut down" state indicates the intermediate node has shut down the VLAN and is not forwarding traffic for the VLAN. The "no learning" state indicates the intermediate node is not adding new entries to the forwarding database 600 for the VLAN. The "no flooding" state indicates the intermediate node is not flooding traffic onto the VLAN and the "active" state indicates the intermediate node is forwarding traffic for the VLAN.

Figure 8A:
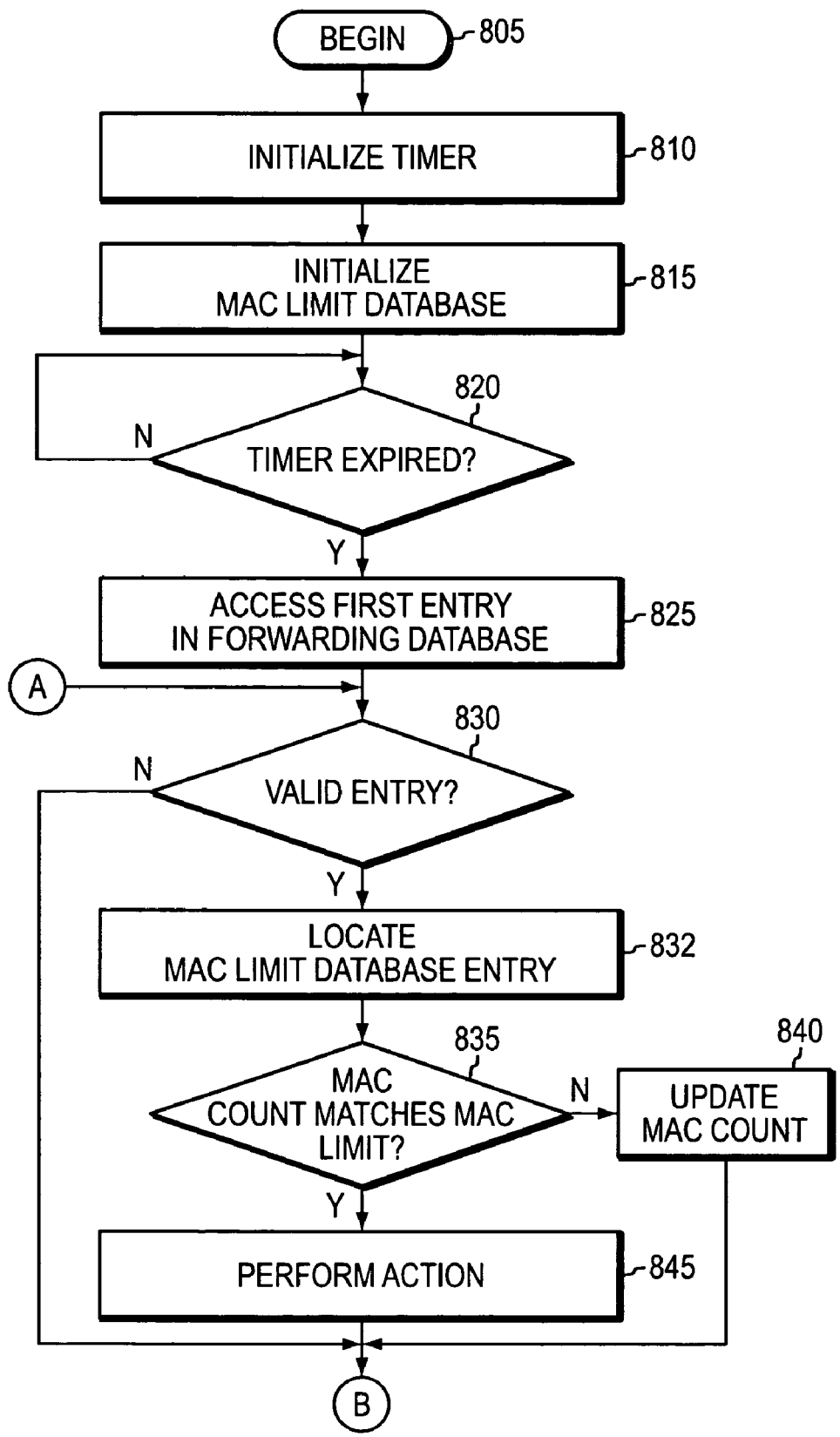
FIGS. 8A–B are flow diagrams of a sequence of steps for processing a packet in accordance with the inventive technique.
Figure 8B:
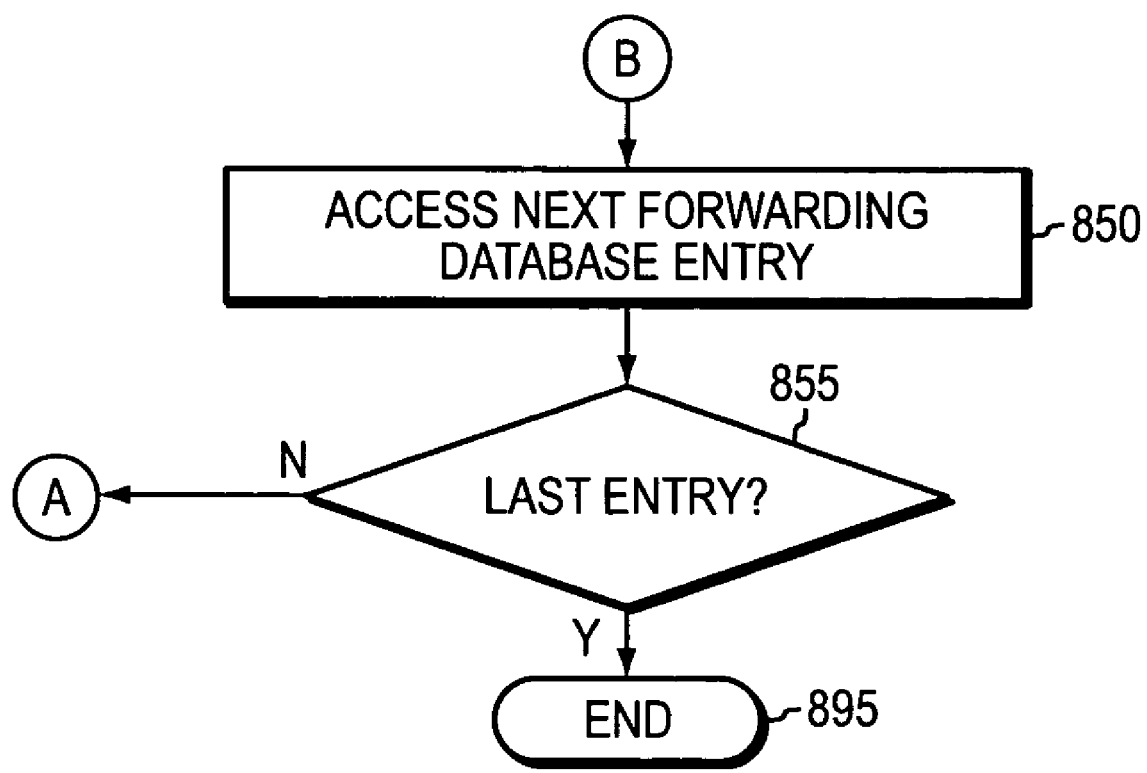

The MAC limit process 534 monitors the forwarding database 600, maintains the MAC count 740 for each VLAN represented in the MAC limit database 700 and takes action if the MAC count 740 for a VLAN matches the MAC limit 750 established for that VLAN. FIGS. 8A–B are a flow diagram of a sequence of steps that may be used to monitor the forwarding database 600, update the MAC limit database 700 and take action, if necessary, in accordance with the inventive technique. The sequence begins at Step 805 and proceeds to Step 810 where processing engine 520 initializes timer 522 to expire at predetermined intervals that are, illustratively, 3-minute intervals. Next, at Step 815, engine 520 initializes the entries 710 in the MAC limit database 700 with information for the various VLANs processed by intermediate node 200. Illustratively, the contents of the MAC count field 740 of the entries 710 are set to zero and the VLAN 730, MAC limit 750 and action 760 fields of the entries 710 are initialized with information generated from predetermined data configured in node 200 by e.g., a network administrator.

At Step 820, engine 520 performs a check to determine if the timer 522 has expired. If not, the sequence returns to Step 820. Otherwise, the sequence proceeds to Step 825 where engine 520 accesses the first entry 610 in the forwarding database 600. At Step 830, engine 520 determines if the entry 610 is "valid" by examining the valid field 620 of the entry 610 to determine if it contains e.g., a one. If not, the sequence proceeds to Step 850. Otherwise, at Steps 832 and 835, engine 520 locates the entry 710 in the MAC limit database 700 associated with the VLAN 640 of the forwarding database entry 610 and determines if the MAC count 740 of the VLAN associated with the forwarding database entry 610 matches the MAC limit 750 for that VLAN by e.g., comparing the content of the entry's MAC count field 740 with the content of the entry's MAC limit field 750. If there is no match, the sequence proceeds to Step 840 where the content of the MAC count field 840 is updated, illustratively, by adding one to the field's content and replacing the content with the results. The sequence then proceeds to Step 850.

If, however, the VLAN entry's MAC count 740 matches the entry's MAC limit 750, the sequence proceeds to Step 845 where engine 520 performs the action indicated by the entry's action field 760. Illustratively, as noted above, this action may include logging the condition as a message in a system log accessible to the intermediate node 200, disabling learning for the VLAN, disabling flooding of data packets for the VLAN and/or halting all traffic for the VLAN by shutting it down. Moreover, engine 520 updates the content of the status field 770 associated with the VLAN to indicate the actions taken. For example, if the action taken includes shutting down the VLAN, the engine 520 updates the status 770 to indicate "shut down." Likewise, if the action taken includes disable flooding and/or disable learning, the engine updates the status 770 to indicate "no flooding" and/or "no learning," respectively.

At Step 850 (FIG. 8B), engine 520 accesses the next forwarding database entry 610 and, at Step 855, checks the entry 610 to determine if the entry 610 is the last entry in the database 600. If so, the sequence proceeds to Step 895 where the sequence ends; otherwise, the sequence returns to Step 830.

Figure 9A:
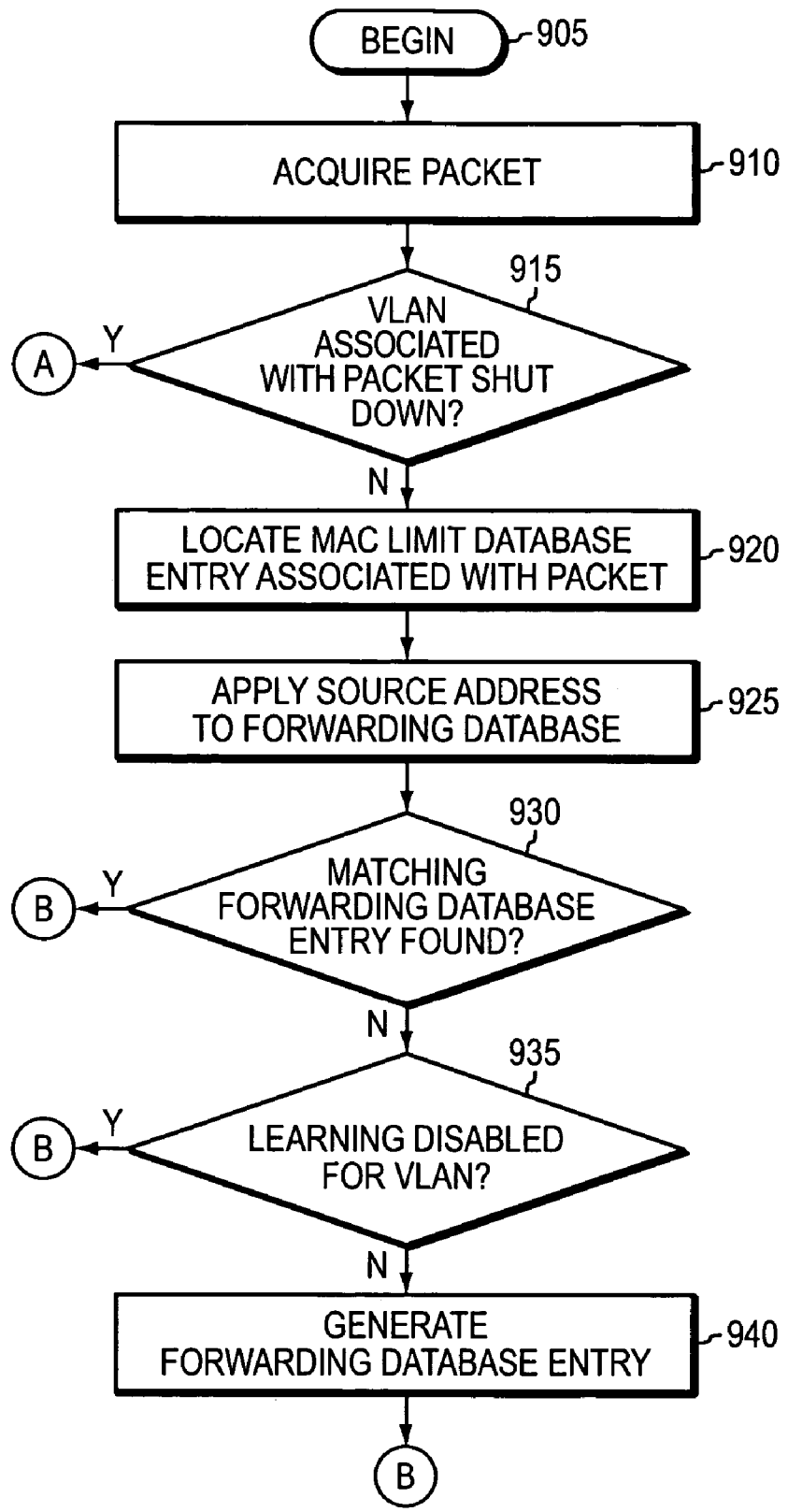
FIGS. 9A–B are flow diagrams of a sequence of steps for processing a MAC limit database in accordance with inventive technique.
Figure 9B:
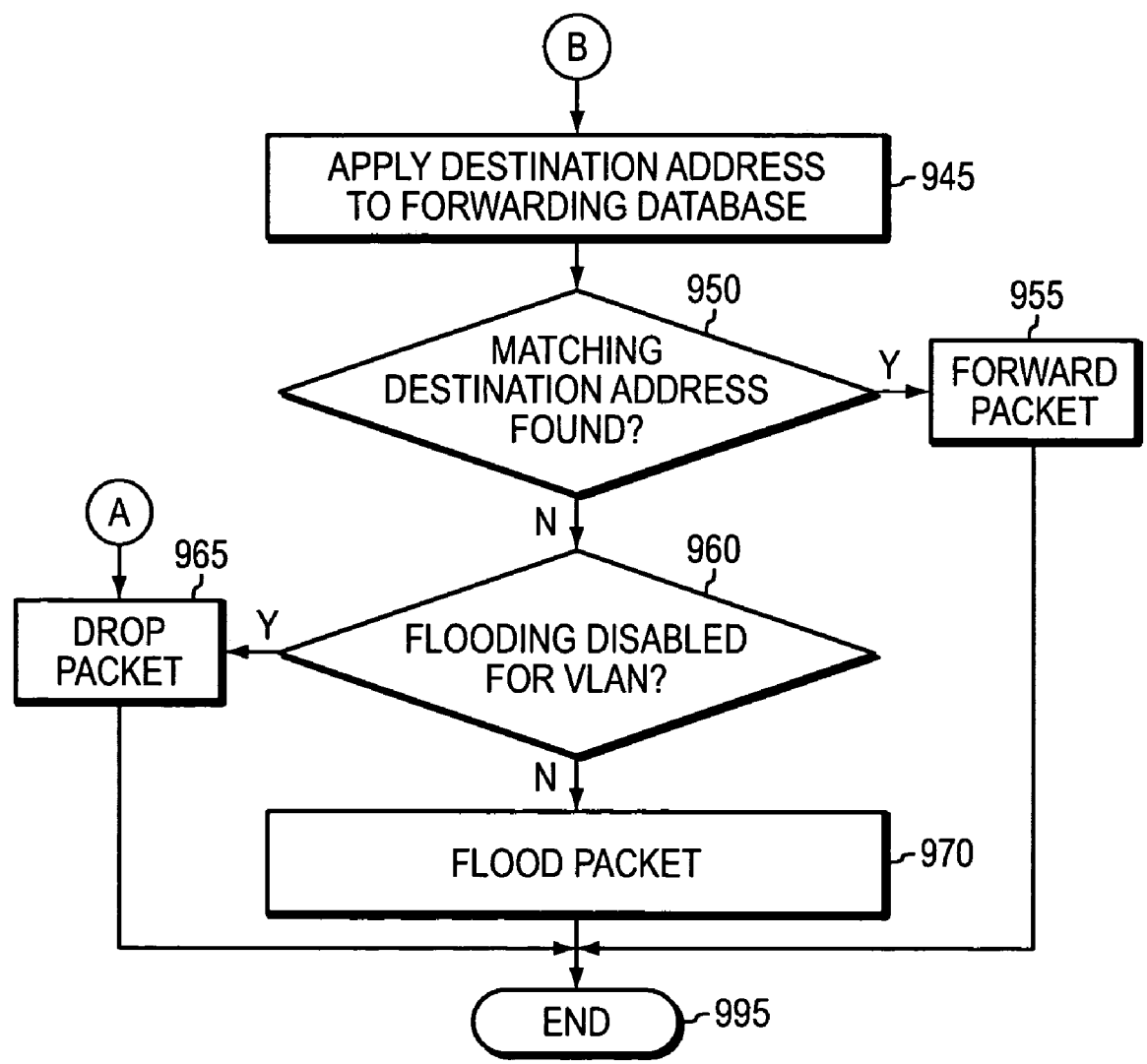

FIGS. 9A–B are a flow chart of a sequence of steps that may be used to configure the EARL 500 to acquire and process a packet in accordance with the inventive technique. The sequence begins at Step 905 and proceeds to Step 910 where a packet is acquired by an input port 215 and is eventually transferred to the input interface logic 510. Next, at Step 915, engine 520 determines if the status 770 of the VLAN associated with the packet indicates the VLAN is shut down. Illustratively, "the VLAN associated with a packet" is a VLAN associated with the input port 217 on which the VLAN was acquired. Alternatively, the packet may be associated with a VLAN associated with a VLAN tag contained in the packet or with a source address contained in the packet. If the VLAN associated with the packet is shut down, the sequence proceeds to Step 965 (FIG. 9B) where the packet is dropped (discarded). The sequence then ends at Step 995.

If the VLAN's status 770 does not indicate the VLAN is shut down, the sequence proceeds to Step 920 where the MAC limit entry 710 for the VLAN associated with the packet is located. Next, at Steps 925 and 930, engine 520 compares a source address contained in the packet with the MAC addresses 630 contained in the forwarding database 600 to determine if an entry 610 contains a MAC address 630 that matches the source address contained in the packet. If so, the sequence proceeds to Step 945 (FIG. 9B). Otherwise, the sequence proceeds to Step 935 where engine 520 determines if learning is disabled for the packet's VLAN by examining the status field 770 associated with the VLAN to determine if it indicates "no learning." If so, the sequence proceeds to Step 945. If not, the sequence proceeds to Step 940 where engine 520 generates a forwarding database entry 610 that contains the packet's source address, VLAN, port and line card information. Specifically, engine 520 places the packet's source address and an identifier that identifies the VLAN associated with the packet in the MAC address field 630 and VLAN field 640, respectively, of an available (invalid) entry 610 in the forwarding database 600. In addition, engine 520 illustratively places identifiers that identify the line card and the port on the line card where the packet was acquired in the line card field 660 and port field 650 of the entry 610, respectively. Engine 520 then sets the content of the entry's valid field 620 to indicate the entry 610 is valid (e.g., sets the field's content to a one).

At Steps 945 and 950, the destination address is compared with the MAC addresses 630 contained in the forwarding database 600 to determine if the destination address matches the MAC address 630 of an entry 610 contained in the database 600. If so, the sequence proceeds to Step 955 where the packet is forwarded in a conventional manner using information contained in the matching entry 610; e.g., the packet is forwarded to the port and line card 400 indicated by the port field 650 and line card field 660 of the matching entry 610. The sequence then ends at Step 995.

If a matching entry 610 is not found, the sequence proceeds to Step 960 where engine 520 determines if flooding is disabled for the packet's VLAN by examining the status 770 associated with the VLAN to determine if it indicates "no flooding." If so, the sequence proceeds to Step 965, where the packet is dropped (discarded). Otherwise, the sequence proceeds to Step 970 where the packet is flooded. The sequence then ends at Step 995.

It should be noted that although various data structures described in the illustrated embodiment described herein are illustrated as tables, other types of data structures, such as linked lists or arrays, may be used to implement these data structures.

It should be further noted that the inventive technique may be implemented in hardware, software (e.g., firmware) or in a combination of hardware and software. For example, a hardware implementation may implement the data structures, such as the forwarding database 600 and MAC limit database 700 in hardware CAMs and the functions performed by the processing engine 520 in one or more hardware state machines. Moreover, a software implementation may implement the databases as software-defined data structures and various functions performed by the hardware as software functions or routines.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate node of a data network, the data network having one or more virtual local area networks (VLANs), the intermediate node containing a forwarding database having one or more forwarding database entries, a method for controlling flooding of packets on a VLAN comprising the steps of:
    referencing a media access control (MAC) limit database comprising one or more MAC limit database entries wherein each entry is associated with a VLAN and contains a MAC limit that indicates a number of forwarding database entries which are allowed to be associated with the VLAN, and a MAC count that indicates a number of forwarding database entries associated with the VLAN;
    using the MAC limit database to determine if a MAC count associated with the VLAN matches the MAC limit associated with the VLAN; and
    if so, performing an action for controlling the flooding of packets on the VLAN.

2. The method of claim 1, the step of using the MAC limit database further comprising:
    locating a MAC limit database entry associated with the VLAN; and
    comparing the MAC count of the MAC limit database entry with the MAC limit of the MAC limit database entry to determine if the number of forwarding database entries associated with the VLAN matches the limit established for the VLAN.

3. The method of claim 1, the step of using the MAC limit database further comprising:
    locating a MAC limit database entry associated with the VLAN;
    comparing the MAC count of the MAC limit database entry with the MAC limit of the MAC limit database entry to determine if the MAC count matches the MAC limit; and
    if not, updating the MAC count.

4. The method of claim 1, the step of performing an action further comprising:
    logging a message to a log accessible to the intermediate node.

5. The method of claim 1, the step of performing an action further comprising:
    disabling flooding for the VLAN.

6. The method of claim 1, the step of performing an action further comprising:
    disabling forwarding packets for the VLAN.

7. The method of claim 1, the step of performing an action further comprising:
    disabling learning for the VLAN.

8. In an intermediate node of a data network, the data network having one or more virtual local area networks (VLANs), the intermediate node containing a forwarding database having one or more forwarding database entries, a method for controlling flooding of packets on a VLAN comprising the steps of:
    establishing a limit that indicates a number of forwarding database entries that are allowed to be associated with the VLAN;
    determining if a number of forwarding database entries associated with the VLAN matches the limit established for the VLAN;
    if so, shutting down the VLAN;
    acquiring a packet associated with the VLAN;
    determining if the VLAN is shut down; and
    if so, dropping the packet.

9. The method of claim 1, further comprising:
    acquiring a packet wherein the packet is associated with the VLAN;
    determining if the forwarding database contains an entry which contains a MAC address that matches a source address contained in the packet;
    if not, determining if learning is disabled for the VLAN; and
    if not, generating a forwarding database entry that contains the source address of the packet.

10. The method of claim 1, further comprising:
    acquiring a packet associated with the VLAN;
    determining if the forwarding database contains an entry which contains a MAC address that matches a destination address contained in the packet;
    if not, determining if flooding is enabled for the VLAN; and
    if so, flooding the packet.

11. An intermediate node coupled to a data network containing one or more VLANs, the intermediate node comprising:
    a forwarding database containing one or more entries wherein each entry is associated with a node accessible to the intermediate node and wherein each entry is associated with a virtual local area network (VLAN);
    a media access control (MAC) limit database having one or more MAC limit database entries wherein each entry is associated with a VLAN and contains a MAC limit that indicates a number of forwarding database entries which are allowed to be associated with the VLAN and a MAC count that indicates a number of entries in the forwarding database associated with the VLAN; and
    a processor configured to, for each VLAN, (i) read a MAC limit associated with the VLAN from the MAC limit database, (ii) read a MAC count associated with the VLAN from the MAC limit database, (iii) determine if the MAC count associated with the VLAN matches the MAC limit associated with the VLAN, and (iv) if so, perform an action for controlling the flooding of packets on the VLAN.

12. The intermediate node of claim 11 comprising:
    the processor further configured to, for each entry in the forwarding database, compare the MAC count with the MAC limit of the VLAN associated with the forwarding database entry to determine if the MAC count matches the MAC limit.

13. The intermediate node of claim 11 comprising:
    the processor further configured to update the MAC count if the MAC count does not match the MAC limit.

14. The intermediate node of claim 11 further comprising:
    the processor configured to log a message to a log accessible to the intermediate node.

15. The intermediate node of claim 11 further comprising:
    the action for controlling the flooding of packets is to disable flooding for the VLAN.

16. The intermediate node of claim 11 further comprising:
the action for controlling the flooding of packets is to disable forwarding packets for the VLAN.

17. The intermediate node of claim 11 further comprising:
the action for controlling the flooding of packets is to disable learning for the VLAN.

18. A system comprising:
means for referencing a media access control (MAC) limit database comprising one or more MAC limit database entries wherein each entry is associated with a VLAN and contains a MAC limit that indicates a number of forwarding database entries which are allowed to be associated with the VLAN and a MAC count that indicates a number of entries in the forwarding database associated with the VLAN;
means for using the MAC limit database to determine if a MAC count associated with the VLAN matches the MAC limit associated with the VLAN; and
means for performing an action for controlling the flooding of packets on the VLAN, if the MAC count associated with the VLAN matches the MAC limit associated with the VLAN.

19. A system comprising:
means for establishing a limit wherein the limit indicates a number of entries which are allowed to be contained in the forwarding database associated with the VLAN;
means for determining if a number of entries in the forwarding database associated with the VLAN matches the limit established for the VLAN;
means for performing an action for controlling the flooding of packets on the VLAN, if the number of entries in the forwarding database associated with the VLAN matches the limit established for the VLAN;
means for accessing an entry in the forwarding database associated with a VLAN;
means for comparing a MAC count with a MAC limit associated with the VLAN to determine if the MAC count matches the MAC limit; and
means for updating the MAC count, if the MAC count does not match the MAC limit.

20. A method for operating an intermediate network node, comprising:
receiving a packet having a VLAN tag;
looking up a MAC destination address of the VLAN packet in a forwarding table;
looking up, in response to not finding the MAC destination address in the forwarding table, a limit of MAC addresses (MAC limit) of the VLAN; and
performing an action for controlling flooding of packets on the VLAN in response to a count of MAC addresses (MAC count) of the VLAN matching the MAC limit for the VLAN.

21. The method of claim 20, further comprising:
logging a message, as the action for controlling flooding on the VLAN.

22. The method of claim 20, further comprising:
disabling flooding for the VLAN, as the action for controlling flooding on the VLAN.

23. The method of claim 20, further comprising:
disabling learning for the VLAN, as the action for controlling flooding on the VLAN.

24. The method of claim 20, further comprising:
shutting down the VLAN, as the action for controlling flooding on the VLAN.

25. The method of claim 20, further comprising:
in response to receiving a VLAN packet for a shut down VLAN, dropping the packet.

26. The method of claim 20, further comprising:
in response to receiving a VLAN packet, looking up a MAC source address of the VLAN packet in the forwarding table;
in response to not finding the MAC source address in the forwarding table, determining if learning is disabled for the VLAN; and
if learning is not disabled for the VLAN, generating a forwarding database entry for the VLAN.

27. The method of claim 20, further comprising:
in response to not finding the MAC destination in the forwarding table, determining if flooding is disabled;
if flooding is disabled, dropping the VLAN packet; and
flooding is not disabled, flooding the VLAN packet out all ports except a receiving port.

28. The method of claim 20, further comprising:
looking up the MAC limit for the VLAN in a MAC limit database.

29. The method of claim 20, further comprising:
looking up the MAC count for the VLAN in a MAC limit database; and
in response to the MAC count not matching the MAC limit, updating the MAC count in the MAC limit database.

30. An intermediate network node coupled to a data network containing one or more VLANs, the intermediate network node comprising:
means for receiving a packet having a VLAN tag;
means for looking up a MAC destination address of the VLAN packet in a forwarding table;
means for looking up, in response to not finding the MAC destination address in the forwarding table, a limit of MAC addresses (MAC limit) of the VLAN; and
means for performing an action for controlling flooding of packets on the VLAN in response to a count of MAC addresses (MAC count) of the VLAN matching the MAC limit for the VLAN.

31. The intermediate network node of claim 30, further comprising:
means for logging a message, as the action for controlling flooding on the VLAN.

32. The intermediate network node of claim 30, further comprising:
means for disabling flooding for the VLAN, as the action for controlling flooding on the VLAN.

33. The intermediate network node of claim 30, further comprising:
means for disabling learning for the VLAN, as the action for controlling flooding on the VLAN.

34. The intermediate network node of claim 30, further comprising:
means for shutting down the VLAN, as the action for controlling flooding on the VLAN.

35. The intermediate network node of claim 30, further comprising:
means for in response to receiving a VLAN packet for a shut down VLAN, dropping the packet.

36. The intermediate network node of claim 30, further comprising:
means for looking up a MAC source address of the VLAN packet in the forwarding table in response to receiving a VLAN packet;
means for determining if learning is disabled for the VLAN in response to not finding the MAC source address in the forwarding table; and
means for generating a forwarding database entry for the VLAN if learning is not disabled for the VLAN.

37. The intermediate network node of claim 30, further comprising:
  means for determining if flooding is disabled in response to not finding the MAC destination in the forwarding table;
  means for dropping the VLAN packet if flooding is disabled; and
  means for flooding the VLAN packet out all ports except a receiving port if flooding is not disabled.

38. The intermediate network node of claim 30, further comprising:
  means for looking up the MAC limit for the VLAN in a MAC limit database.

39. The intermediate network node of claim 30, further comprising:
  means for looking up the MAC count for the VLAN in a MAC limit database; and
  means for updating the MAC count in the MAC limit database in response to the MAC count not matching the MAC limit.

40. An intermediate network node coupled to a data network containing one or more VLANs, the intermediate network node comprising:
  one or more line cards configured to receive VLAN packets;
  a forwarding database configured to store one or more MAC destination address associated with one or more VLANs; a media access control (MAC) limit database configured to store one or more MAC limit database entries, each MAC limit database entry associated with a VLAN and containing a limit of MAC addresses (MAC limit) for the VLAN and a count of MAC addresses of the VLAN; and
  a processor configured to perform an action for controlling flooding of packets on a VLAN in response to the MAC count of the VLAN matching the MAC limit for the VLAN.

41. The intermediate network node of claim 40, further comprising:
  the processor configured to log a message, as the action for controlling flooding on the VLAN.

42. The intermediate network node of claim 40, further comprising:
  the processor configured to disable flooding for the VLAN, as the action for controlling flooding on the VLAN.

43. The intermediate network node of claim 40, further comprising:
  the processor configured to disable learning for the VLAN, as the action for controlling flooding on the VLAN.

44. The intermediate network node of claim 40, further comprising:
  the processor configured to shut down the VLAN, as the action for controlling flooding on the VLAN.

45. The intermediate network node of claim 40, further comprising:
  the processor configured to drop a VLAN packet, in response to receiving the VLAN packet for a shutdown VLAN.

46. The intermediate network node of claim 40, further comprising:
  the processor configured to look up a MAC source address of a VLAN packet in the forwarding table;
  the processor configured to determine if learning is disabled for the VLAN, in response to not finding the MAC source address of the VLAN in the forwarding table; and
  the processor configured to generate a forwarding database entry for the VLAN, if learning is not disabled for the VLAN.

47. The intermediate network node of claim 40, further comprising:
  the processor configured to determine if flooding is disabled for a VLAN, in response to not finding a MAC destination for a VLAN packet in the forwarding table;
  the processor configured to drop the VLAN packet, if flooding is disabled; and
  the process configured to flood the VLAN packet out all ports except a receiving port, if flooding is not disabled.

48. The intermediate network node of claim 40, further comprising:
  the processor configured to look up a MAC limit for a VLAN in the MAC limit database.

49. The method of claim 40, further comprising:
  the processor configured to look up a MAC count for a VLAN in the MAC limit database; and
  the processor configured to update the MAC count in the MAC limit database, in response to the MAC count not matching the MAC limit.

50. A computer readable media, comprising:
  the computer readable media containing instructions for operating an intermediate network node for,
  receiving a packet having a VLAN tag;
  looking up a MAC destination address of the VLAN packet in a forwarding table;
  looking up, in response to not finding the MAC destination address in the forwarding warding table, a limit of MAC addresses (MAC limit) of the VLAN; and
  performing an action for controlling flooding of packets on the VLAN in response to a count of MAC addresses (MAC count) of the VLAN matching the MAC limit for the VLAN.

* * * * *